(12) United States Patent
Agrawal (10) Patent No.: US 10,026,088 B2
(45) Date of Patent: Jul. 17, 2018

(54) PAYMENT PROCESSING USING MULTIPLE TRANSACTION CHANNELS

(71) Applicant: Tarun Agrawal, Bangalore (IN)

(72) Inventor: Tarun Agrawal, Bangalore (IN)

(73) Assignee: CA, Inc., New York, NY (US)

( * ) Notice: Subject to any disclaimer, the term of this patent is extended or adjusted under 35 U.S.C. 154(b) by 868 days.

(21) Appl. No.: 14/253,092

(22) Filed: Apr. 15, 2014

(65) Prior Publication Data
US 2015/0294315 A1 Oct. 15, 2015

(51) Int. Cl.
| | |
|---|---|
| G06G 1/12 | (2006.01) |
| G06Q 20/40 | (2012.01) |
| G06Q 20/20 | (2012.01) |
| G06Q 20/36 | (2012.01) |
| G06Q 30/06 | (2012.01) |
| G06Q 40/00 | (2012.01) |
| G06Q 20/32 | (2012.01) |
| G06Q 20/10 | (2012.01) |
| G06Q 20/34 | (2012.01) |

(52) U.S. Cl.
CPC ........... *G06Q 20/409* (2013.01); *G06Q 20/10* (2013.01); *G06Q 20/20* (2013.01); *G06Q 20/202* (2013.01); *G06Q 20/3278* (2013.01); *G06Q 20/34* (2013.01); *G06Q 20/36* (2013.01); *G06Q 20/40* (2013.01); *G06Q 20/405* (2013.01); *G06Q 30/06* (2013.01); *G06Q 40/12* (2013.12)

(58) Field of Classification Search
CPC ...... G06Q 30/06; G06Q 20/202; G06Q 20/20; G06Q 20/209; G06Q 20/3278
USPC .......................................................... 705/21
See application file for complete search history.

(56) References Cited

U.S. PATENT DOCUMENTS

| | | | | |
|---|---|---|---|---|
| 7,849,014 B2* | 12/2010 | Erikson | .................. | G06Q 20/10 705/35 |
| 2009/0210344 A1* | 8/2009 | Lange | .................... | G06Q 20/04 705/44 |
| 2015/0019443 A1* | 1/2015 | Sheets | ................ | G06Q 20/3278 705/71 |
| 2015/0052064 A1* | 2/2015 | Karpenko | .......... | G06Q 20/3829 705/71 |

OTHER PUBLICATIONS

Patents; "Cloud Proxy Secured Mobile Payments" in Patent Application Approval Process Journal of Engineering; Atlanta [Atlanta] Sep. 18, 2013: 1514.*

* cited by examiner

*Primary Examiner* — Florian M Zeender
*Assistant Examiner* — Fawaad Haider
(74) *Attorney, Agent, or Firm* — Baker Botts L.L.P.

(57) ABSTRACT

A method includes receiving, from a payment intermediary, a request for approval of a card-not-present payment transaction between a customer and a merchant. The request for approval includes transaction details indicative of a credit account of the customer. The credit account established at an issuing institution. The method also includes transmitting the request for approval to the issuing institution. The method further includes receiving an authorization response from the issuing institution, the authorization response indicative of whether the card-not-present payment transaction is approved. The method additionally includes transmitting the authorization response to a terminal of the merchant, the request for approval not originating from the terminal.

11 Claims, 3 Drawing Sheets

PAYMENT PROCESSING USING MULTIPLE TRANSACTION CHANNELS

BACKGROUND

The disclosure relates generally to payment processing, and more specifically, to payment processing using multiple transaction channels.

SUMMARY

According to one embodiment of the disclosure, a method includes receiving, from a payment intermediary, a request for approval of a card-not-present payment transaction between a customer and a merchant. The request for approval includes transaction details indicative of a credit account of the customer. The credit account established at an issuing institution. The method also includes transmitting the request for approval to the issuing institution. The method further includes receiving an authorization response from the issuing institution, the authorization response indicative of whether the card-not-present payment transaction is approved. The method additionally includes transmitting the authorization response to a terminal of the merchant, the request for approval not originating from the terminal.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

New methods for initiating, transacting, and processing electronic commerce transactions have made purchasing goods online more convenient and secure for consumers. Due to this increase in convenience, flexibility, and security, customers may prefer that these payment methods be accepted in other commerce settings. For example, a merchant owning a traditional "bricks and mortar" store location may want to allow customers to pay for goods purchased at the physical store location using a digital payment vehicle. Instead of swiping a credit card, the merchant may invoice the user via a smartphone application, and allow the customer to pay by selecting a payment method from a payment vehicle that is accessible via the smartphone.

Installing systems equipped to handle these types of payment methods may be less difficult for new companies that have not spent money on payment processing infrastructure. However, traditional merchants with physical store-fronts may have already spent significant resources investing in payment processing infrastructure including cash registers and point of sale terminals equipped to physically interact with a payment card. This equipment may not be suitable for accepting these emerging payment technologies.

The teachings of the present disclosure may allow merchants to use their existing payment terminals to accept payments from a variety of payment vehicles by receiving payment authorizations from a payment processor over a separate transaction channel. Thus, merchants may not have to upgrade the physical equipment that make up their current point of sale terminals.

The teachings of the present disclosure may enable customers of these merchants to use their preferred payment methods to purchase items. For example, where a merchant does not have equipment necessary to accept certain virtual, digital, and/or cloud based payment forms, the teachings of the present disclosure may enable the merchant to accept these payment forms and print a receipt using a terminal. This may be accomplished without requiring the merchant to upgrade any equipment.

Figure 1:
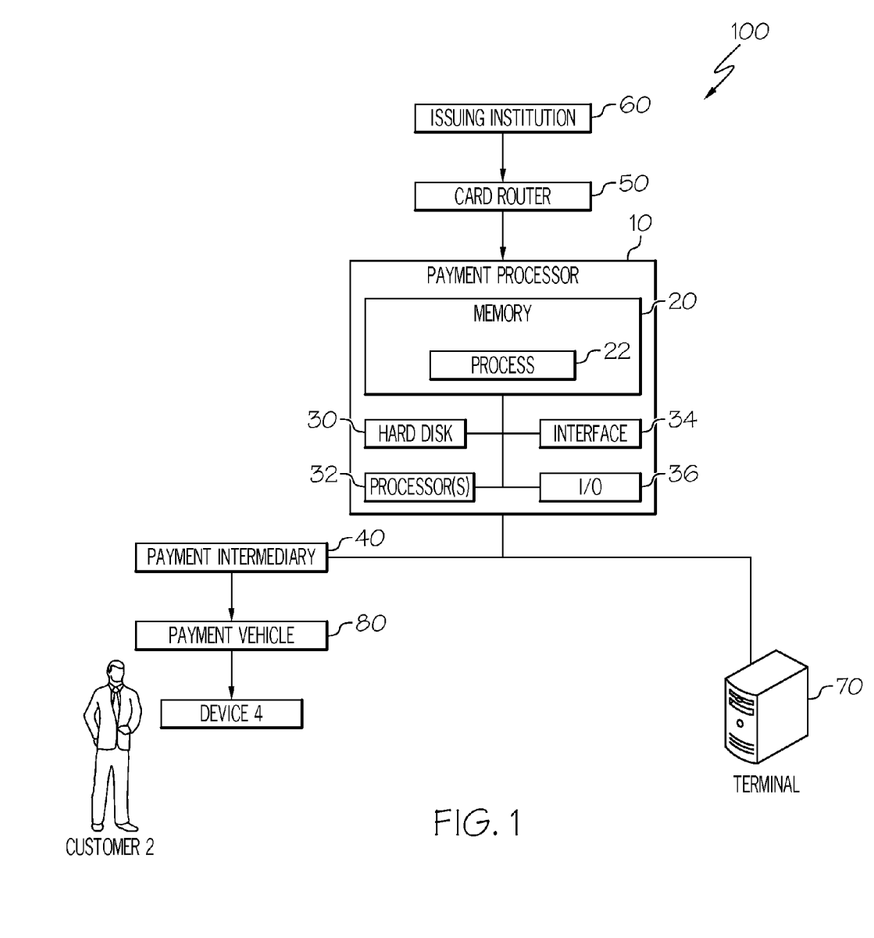
FIG. 1 illustrates a block diagram of a system for processing payments using multiple transaction channels in accordance with a particular non-limiting embodiment of the present disclosure.

With reference to FIG. 1, a system 100 for processing payments using multiple transaction channels is illustrated in accordance with a particular non-limiting embodiment of the present disclosure. The system includes payment intermediary 40, payment processor 10, credit account router 50, issuing institution 60, and terminal 70. Customer 2 operates a device 4 which accesses a payment vehicle 80. Customer 2 may purchase items from a merchant. The merchant may have access to terminal 70. A total amount due for the items is calculated. Customer 2 may be invoiced for the items via device 4. In certain embodiments, customer 2 may manually enter an amount to pay for the items into an application running on device 4. Customer 2 may initiate a payment transaction via device 4. Device 4 may use payment information stored in payment vehicle 80 to initiate payment authorization with payment intermediary 40. Payment intermediary 40 contacts payment processor 10. Payment processor 10 formats part of the request and forwards the authorization to an appropriate credit account router 50. Credit account router 50 determines the issuing institution for the payment method. For example, if customer 2 pays for the purchases with a credit card, the bank that issues the credit card may be determined. Issuing institution 60 approves or denies the transaction. This response is forwarded to payment processor 10. Payment processor 10 re-routes the response to terminal 70. Terminal 70 may print a receipt for the user, and may display that the transaction has been approved.

The example illustrated in FIG. 1 includes a customer 2 using a device 4 that accesses a payment vehicle 80. However, any sort of digital payment configuration may be substituted for the configuration presented in system 100. For example, a typical e-commerce payment transaction method may be used to initiate a payment at payment intermediary 40. As another example, a biometric device on device 4 may authenticate a user and allow the user to access a payment vehicle of credit card and bank information stored on device 4. This information may then be sent to the payment intermediary 40. Various other payment processing configurations may be substituted for and/or configured for use with device 4, payment vehicle 80, and payment intermediary 40.

In certain embodiments, digital payment solutions may send transaction authorization requests directly to payment processor 10. For example, a cloud wallet service may maintain a list of payment cards and accounts for customer 2. The cloud wallet may communicate directly with payment processor 10 in order to transact future payment transactions.

In certain embodiments, an application running on device 4 may communicate with terminal 70 via a network. For example, device 4 may have a cellular network connection that receives an invoice for attempted purchases. An application on device 4 may receive this invoice and present it to the user for approval. The application may also contain information about the payment processor 10 and the payment intermediary 40.

When the user approves this invoice, the payment process described above may be initiated. In the request for payment authorization, information about the transaction may also be sent to the payment intermediary. For example, a terminal 70 identifier may be submitted with the payment request. As another example, customer 2 may scan a quick response code ("QR code") that identifies terminal 70. In this example, terminal 70 may be a physical point of sale terminal.

In certain embodiments, the terminal 70 may be detected via a global positioning satellite ("GPS") device or other sensor on device 4, terminal 70, or connected to a network within the physical storefront. For example, payment processor 10 may receive information regarding the location of customer 2, and may direct payment authorization information to terminal 70. In this example, terminal 70 may be located within a predetermined distance range from customer 2. As another example, terminal 70 is a terminal dedicated to receiving confirmation of electronic commerce transactions. In certain embodiments, other methods of detecting an appropriate terminal 70 may be used.

Information regarding terminal 70 may be used in the payment process. For example, when payment processor receives an approval or denial of payment authorization from issuing institution 60 or credit account router 50, the approval may be routed to terminal 70, so that the user may be presented with a printed receipt of the transaction. A store clerk or manager may be notified of the payment. In certain embodiments, terminal information may be sent to the user via device 4. In the above example describing an invoice presented on device 4, when the user submits payment of the invoice, information regarding the terminal is sent with the payment authorization request. Payment processor 10 receives this information and re-routes the authorization response to the appropriate terminal 70.

Figure 2:
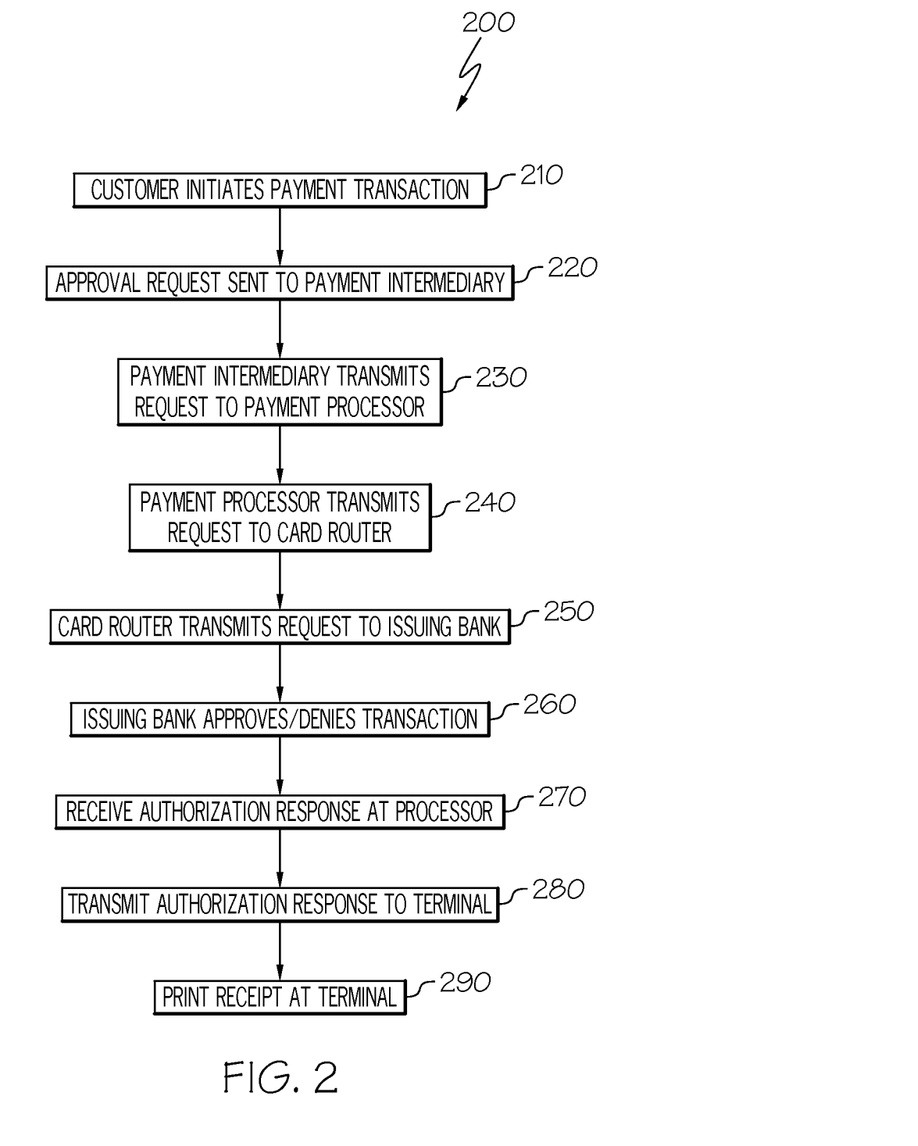
FIG. 2 illustrates a flow chart of a method for processing payments using multiple transaction channels in accordance with a non-limiting embodiment of the present disclosure.

With reference to FIG. 2, a method 200 for processing payments using multiple transaction channels is illustrated in accordance with a particular embodiment of the present disclosure. At step 210, a customer initiates a payment transaction. In certain embodiments, the customer may initiate the payment transaction from a payment vehicle, such as a digital wallet. In certain embodiments, the customer may initiate the payment transaction at a physical store-front of a merchant. In certain embodiments, the customer may initiate the payment transaction via an online ordering web-site. The customer may initiate a payment transaction using any suitable processes for payment initiation.

At step 220, a request for payment approval is sent to a payment intermediary. The payment intermediary may establish a secure communication channel for receiving payment information. For example, in an online ordering context, an electronic commerce payment may be initiated by completing form containing credit card information and submitting the form to either the merchant site or directly to a payment intermediary. When the form is submitted to the merchant site, contents of the form may be forwarded via a secure communication channel to the payment intermediary. In this example, the payment intermediary may be a payment gateway.

In certain embodiments, the payment intermediary may receive payment information and securely broker the payment information between a payment processor and the customer or paying agent. For example, in certain traditional payment processes, the payment authorization response may be submitted back to the customer through the payment intermediary.

At step 230, the payment intermediary transmits the request for payment approval to a payment processor. In certain embodiments, the payment processor may format the request in an appropriate format and/or process information from the request. For example, the payment processor may obtain a merchant identifier and/or a terminal identifier from the request. This information may be used in re-routing the authorization response to the appropriate transaction channel.

The payment processor may also determine a credit account router to send the request to. For example, the payment processor may determine, based on information embedded in the payment approval request, that the appropriate credit account router to send the request to is a VISA® credit account router, or card association. Other credit account routers and/or card associations may be determined based on information embedded in the request.

At step 240, the payment processor transmits the request to a credit account router. A credit account router in this instance may represent a branded card association. In certain embodiments, the credit account router may contain information regarding issuing institutions for a payment method. The credit account router may maintain records of issued credit accounts and corresponding issuing institutions.

In certain embodiments, the credit account router may have authorization to approve or deny transactions. For example, certain branded card associations may make the approval determination without input from the issuing institution and/or bank. In certain embodiments, the credit account router may be affiliated with a particular branded card association.

In certain embodiments, the credit account router may include a national and/or regional retail payment system hub. A regional payment system hub may provide credit account authorization and routing for transactions within a certain region or country. For example, the credit account router may include National Payments Corporation of India ("NCPI"). As another example, the credit account router may include China Union Pay ("CUP"). As yet another example, the credit account router may include PagoBancomat.

At step 250, the credit account router transmits requests for payment approval to an issuing institution. In certain embodiments, the issuing institution may be a financial institution that issued the payment vehicle to the customer. In certain embodiments, the financial institution may be a bank and the credit vehicle may be a credit card. At step 260, the issuing institution approves and/or denies the transaction.

At step 270, the authorization response is received at the payment processor. At step 280, the payment processor may be responsible for routing the authorization response to the appropriate destination. For example, during traditional payment approval processes, the payment processor may route the authorization response to the requesting node. Using the elements of FIG. 1 in a traditional payment processing transaction, payment processor 10 may route the response back to payment intermediary 40 for further action.

In certain embodiments of the present disclosure, payment processor may re-route the response. For example, payment processor 10 may re-route the response to terminal 70. Thus, the payment process may utilize multiple transaction channels in a single transaction.

In certain embodiments, the proper end point for routing approval responses may be specified in the payment authorization request. For example, identification numbers corresponding to physical point of sale terminals at a merchant location may be included in the authorization request. The payment processor may route the response to the identified terminal based on this information.

In certain embodiments the merchant may specify the appropriate terminal to route approval information to at the payment processor. For example, a predetermined identifier for an appropriate terminal may be specified for some and/or all transactions received from a payment intermediary.

At step 290, the terminal may display an approval message to the user and/or the merchant. For example, a printed receipt may show whether the transaction was approved or denied. Records may be kept based on the approvals or denials received at the terminal. In certain embodiments where the user is not present at the terminal location, the terminal may display a transaction approval message only to the merchant. In certain embodiments, no receipt may be printed when the approval response is received. Instead, only a record may be made of the transaction.

In certain embodiments, the terminal is a credit card processing machine. For example, merchant companies may have invested resources in infrastructure for accepting credit cards, such as credit card processing terminals and other point of sale terminals. These same terminals may be used in certain embodiments of the present disclosure. This may allow merchants to utilize existing infrastructure resources while accommodating user preferences to use emerging and newly established payment vehicles that may not accepted at such legacy terminals using traditional payment processing techniques.

Figure 3:
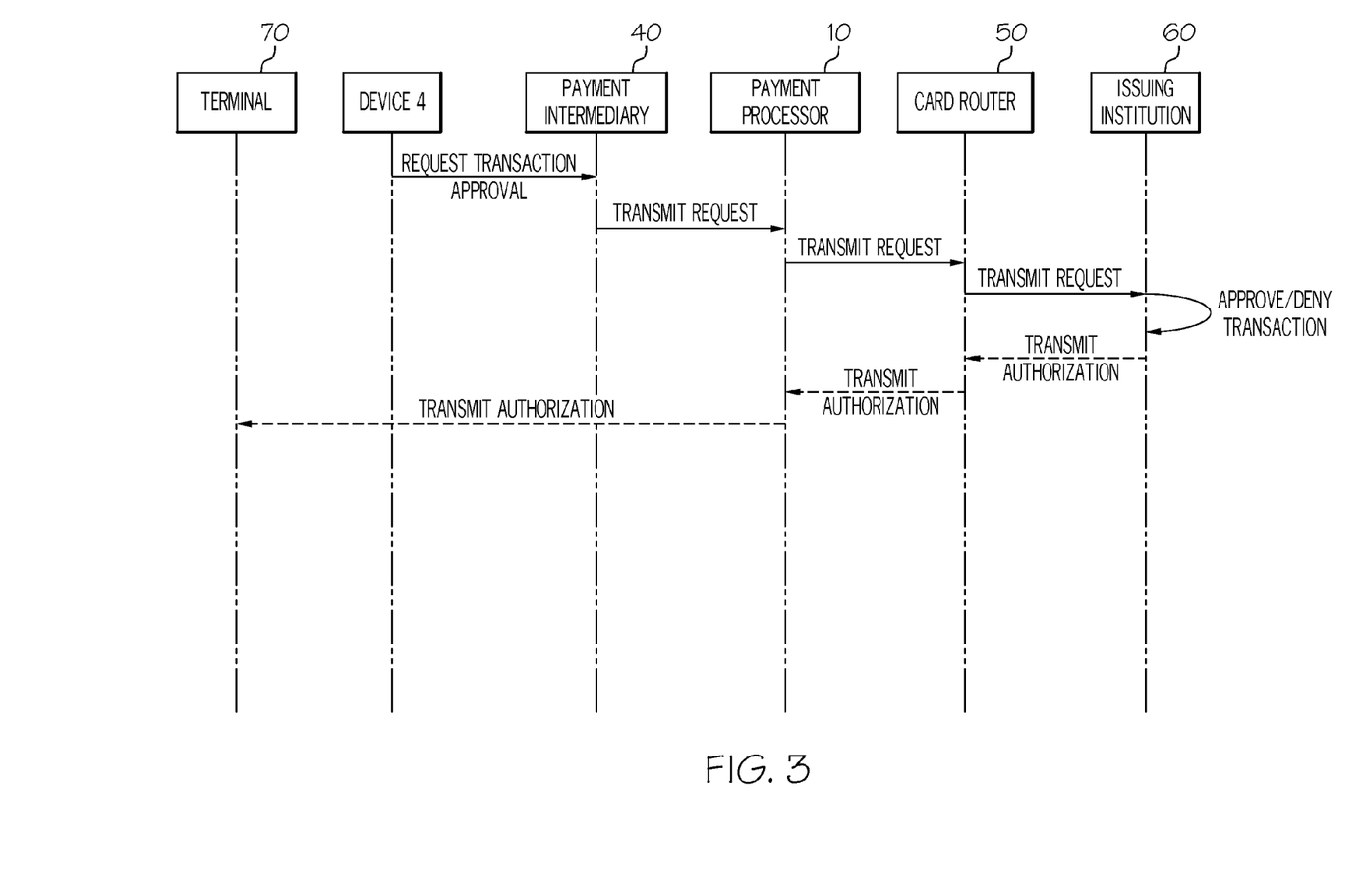
FIG. 3 illustrates a sequence diagram of a system for processing payments using multiple transaction channels in accordance with a non-limiting embodiment of the present disclosure.

With reference to FIG. 3, a sequence diagram is shown incorporating elements from the system 100 from FIG. 1. For example, terminal 70, device 4, payment intermediary 40, payment processor 10, credit account router 50, and issuing institution 60 may be illustrated in accordance with the non-limiting embodiment shown in FIG. 3. One example sequence of events in a payment processing transaction using multiple transaction channels is illustrated in FIG. 3.

Cardholder transactions may be executed in a variety of manners and settings. While several basic processes for transacting payment have emerged, many variations exist depending on the customer's physical location, and the availability of credit card information. For example, a cardholder may make a payment using their credit card at a physical location of a vendor by swiping their card at the vendor's sensor. This may be referred to as a card present transaction. In these transactions, the physical card is swiped at a point of sale terminal. This may initiate a card authorization request from the vendor to the bank that issued the credit card. An authorization response is generally received at the point of sale terminal, i.e., a printed receipt may be issued. In general, payment requests and responses may be issued and received through the same channel via the point of sale terminal.

Cardholder transactions may also be executed through alternate channels. For example, consumers may use their credit cards to make purchases over the internet by typing in their credit card number and entering other personally identifiable information in order to authenticate the use of the card and allow the card issuing institution to authorize the transaction. These transactions may be referred to as "card not present" transactions. Other examples of card not present transactions include transacting credit card payments over phone lines, via mobile applications, mail order, and/or telephone order.

In card not present transactions, card information may be provided to a middleware application. For example, card information may be provided to a payment intermediary. The payment intermediary may authorize the payment request by contacting the issuing institution for approval. When the issuing institution has finished processing the authorization request, a response may be sent back to the payment intermediary. The payment intermediary may forward that response back to the requesting merchant. In this scenario, authorization requests and responses are transacted through the same channel, i.e., the payment intermediary.

The teachings of the present disclosure may allow cardholders to initiate payment authorization requests through a single channel, while payment authorization responses may be received through a separate channel. For example, cardholders may initiate payment using card not present techniques, such as via mobile application, website, and/or over the phone. The payment authorization response may be received through a different channel, such as at a point of sale terminal. The point of sale terminal may then issue a printed receipt for the transaction.

The teachings of the present disclosure may utilize different payment processing transaction flows that may combine various entities and/or modules to allow customers to make payments at a variety of existing terminals. Merchants using existing transaction processing techniques may need to update existing payment processing infrastructure in order to accept emergent payment forms, such as e-wallets, cloud wallets, and payment vehicles. For example, traditional merchants using card present transaction processing techniques may have invested significant capital in infrastructure for processing payment transactions using these traditional card present techniques. In order for these merchants to accept emergent payment technologies that may utilize card not present transaction processes, the merchant may have to significantly modify their payment processing infrastructure from traditional card-present point of sale terminals.

The teachings of the present disclosure may enable merchants to accept and process payment transactions in a variety of emerging payment technologies, while still using legacy infrastructure. For example, cards within e-wallets, mobile wallets, payment vehicles, cloud wallets, and other forms of digital payment may be accepted. Existing payment acceptance infrastructure and settlement processes may be utilized to accept payment responses and verification, and print receipts.

In certain embodiments, a cardholder initiates a payment request from a mobile device using a mobile protocol. Mobile protocols may include SMS, interactive voice response, a mobile application, a mobile web browser, and/or any other mobile payment protocol for transmitting payment information. The mobile device may send the payment request with payment information to a payment intermediary for purchase transaction and/or approval.

The payment intermediary may receive the request and direct the request to a merchant aggregator. The merchant aggregator may process the request and send it to the credit account router, which may direct the request further to the card issuer. The transaction may be authorized or denied by the card issuer.

After authorization by the card issuer, a response containing the authorization may be sent back to the credit account router, which routes the response back to the merchant aggregator. The merchant aggregator may format the response and redirect the response to the merchant's point of sale physical terminal. In certain embodiments, the response may need to be re-routed from the requesting node to the merchant's physical point of sale terminal. For example, the transaction may have been initiated as a card not present transaction. However, the response may be delivered as if requested using a traditional card present transaction.

In certain embodiments, a point of sale terminal at the merchant's physical location may print the authorization receipt. This receipt may be similar to receipts issued during traditional card present point of sale transactions. Thus, a merchant's existing transaction processing infrastructure may be leveraged in certain embodiments of the present disclosure. Investment in new infrastructure may thus be limited or eliminated by the teachings of the present disclosure.

The teachings of the present disclosure may enable merchants to continue to receive payment confirmations using existing point of sale terminals. Thus, credit card processing infrastructure may not need to be changed. Cardholders may further make payments without presenting physical cards for scanning at physical store locations. Merchants may accept both traditional credit cards and digital payment forms using legacy payment processing infrastructure.

A payment vehicle may include any physical or cloud based electronic device that allows an individual to make an electronic commerce transaction. References to payment vehicle may include any computer software or service that stores and/or manages credit cards, debit cards, check cards, checking account numbers, or digital currency holdings for a user. In certain embodiments, a payment vehicle may refer to a digital wallet, PAYPAL® account, or other type of digital repository of payment accounts.

For example, a payment vehicle may include Paypal, GOOGLE WALLET®, or a similar technology. As another example, a payment vehicle may be a cloud based repository for payment information, such as ICLOUD KEYCHAIN®.

In certain embodiments, a payment intermediary may refer to a payment gateway, or any intermediary that facilitates electronic commerce transactions by receiving customer payment initiation requests. For example, in the electronic commerce setting, a payment gateway may authorize credit card payments for online retailers by communicating between the customer and merchant through a merchant payment processor. However, payment intermediary may include authorizing payment transactions at physical storefronts.

In certain embodiments, device 4 may refer to any device having a processor that is capable of communicating over a network to initiate payment transactions. For example, device 4 may include a smartphone, or other smart device. As another example, device 4 may include a computer, e.g., a desktop or laptop computer, or any device with a processor. In certain embodiments, device 4 may be a standard telephone. For example, a user may initiate a payment transaction over the phone by, for instance, reciting a credit card number to an operator.

In certain embodiments, device 4 may run applications that are capable of storing and/or communicating with services that store payment information. For example, a merchant may develop an application to receive payments from a user. As another example, a third party may develop an application that connects merchants to customers and enables digital payment transactions.

In certain embodiments, device 4 may contain peripheral devices. For example, device 4 may contain a network card for connecting to a network. As another example, device 4 may contain a camera or scanner for scanning QR codes or other visible information. As another example, device 4 may contain a near field communication transmitter and receiver. As another example, device 4 may emit an electromagnetic signal that may be detected by sensors. As another example, device 4 may contain a GPS device. Device 4 may further be capable of communicating with and connecting to a variety of other devices that may further be used in embodiments of the present disclosure.

In certain embodiments, payment information may refer to credit card numbers, personal identification numbers, personally identifiable information, verification numbers, account numbers, routing numbers, and information relating to any other payment identification system.

In certain embodiments, a credit account router includes a card association, such as VISA®, MASTERCARD®, and/or AMERICAN EXPRESS®. A credit account router may include any service or process that identifies a responsible issuing institution to request approval for a transaction based on a request for transaction approval.

In certain embodiments, an issuing institution includes any institution that offers any type of payment card to a consumer. For example, an issuing institution may include a bank that offers a Visa branded credit card.

In certain embodiments a terminal includes any physical device capable of receiving payment authorization responses. For example, terminal 70 may be a computer connected to a network that receives credit authorization from a payment processor, such as payment processor 10. As another example, a terminal may be a point of sale terminal owned by a merchant. A merchant may use point of sale terminals to scan credit cards and receive credit authorizations. The terminal may be capable of displaying an approval message. The terminal may be capable of printing an approval message, e.g., a receipt for the transaction.

In certain embodiments, a card present transaction may refer to any payment transaction wherein the payment card and the payment cardholder are physically present when the payment is executed. In certain embodiments, a card not present transaction may refer to any payment transaction where the cardholder is not physically present with the card at the time the payment is affected.

The teachings of the present disclosure may be applied to both card not present and card present transactions. For example, the terminals discussed in accordance with FIG. 1 may be configured for use in card present transactions. However, payment processor 10 may re-route transactions that were not initiated at terminal 70 to reach terminal 70. Thus, terminal 70 may be used in traditional card present and card not present transactions.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   transmitting, by a server, a request for approval of a card-not-present payment transaction, initiated at a point of sale, to an issuing institution, the request for approval (1) originating from a first terminal, operated by a merchant and located at the point of sale, that is operable to initiate card-not-present transactions but is not operable to complete transactions and (2) comprising an instruction to route any authorization response corresponding to the request for approval to a second terminal operated by the merchant and located at the point of sale instead of the first terminal, wherein the second terminal is not able to initiate card-not-present transactions but is operable to complete transactions, wherein the merchant operates a plurality of other terminals at different locations, the plurality of other terminals each configured to transmit approval requests to the server, receive authorization messages from the server, and display the authorization messages to users, and wherein the first terminal is not operable to receive or display authorization messages;
   receiving an authorization response from the issuing institution, the authorization response indicative of whether the card-not-present payment transaction is approved, wherein the authorization response contains routing information indicative of a response path that includes the payment intermediary;
   transmitting the authorization response, based on the instruction, to the second terminal at the point of sale instead of the first terminal to complete the card-not-present payment transaction, wherein the transmitting comprises re-routing the authorization response from an original authorization response path ending at the first terminal to a modified authorization response path ending at the second terminal; and
   receiving a second request for approval of a card-present payment transaction from the second terminal, wherein the second terminal is configured to format for display at least a portion of the authorization response for display to the customer.

2. The method of claim 1, wherein the transaction details are further indicative of the second terminal, and wherein the authorization response is transmitted to the second terminal based on the transaction details.

3. The method of claim 1, wherein the card-not-present payment transaction is initiated by the customer as an electronic commerce transaction.

4. The method of claim 1, wherein the card-not-present payment transaction is initiated by the customer using a digital wallet.

5. A computer configured to access a storage device, the computer comprising:
   a processor; and
   a non-transitory, computer-readable storage medium storing computer-readable instructions that when executed by the processor cause the computer to perform:
   transmitting, by a server, a request for approval of a card not present payment transaction, initiated at a point of sale, to an issuing institution, the request for approval (1) originating from a first terminal, operated by a merchant and located at the point of sale, that is operable to initiate card-not-present transactions but is not operable to complete transactions and (2) comprising an instruction to route any authorization response corresponding to the request for approval to a second terminal operated by the merchant and located at the point of sale, wherein the second terminal is not able to initiate card-not-present transactions but is operable to complete transactions, wherein the merchant operates a plurality of other terminals at different locations, the plurality of other terminals each configured to transmit approval requests to the server, receive authorization messages from the server, and display the authorization messages to users, and wherein the first terminal is not operable to receive or display authorization messages;
   receiving an authorization response from the issuing institution, the authorization response indicative of whether the card-not-present payment transaction is approved, wherein the authorization response contains routing information indicative of a response path that includes the payment intermediary;
   transmitting the authorization response, based on the instruction, to the second terminal at the point of sale instead of the first terminal to complete the card-not-present payment transaction, wherein the transmitting comprises re-routing the authorization response from an original authorization response path ending at the first terminal to a modified authorization response path ending at the second terminal; and
   receiving a second request for approval of a card-present payment transaction from the second terminal, wherein the second terminal is configured to format for display at least a portion of the authorization response for display to the customer.

6. The computer of claim 5, wherein the transaction details are further indicative of the second terminal, and wherein the authorization response is transmitted to the second terminal based on the transaction details.

7. The computer of claim 5, wherein the card-not-present payment transaction is initiated by the customer as an electronic commerce transaction.

8. The computer of claim 5, wherein the card-not-present payment transaction is initiated by the customer using a digital wallet.

9. A computer program product comprising:
   a computer-readable storage medium having computer-readable program code embodied therewith, the computer-readable program code comprising:
   computer-readable program code configured to transmit, from a server, a request for approval of a card-not-present payment transaction to an issuing institution, the request for approval (1) originating from a first terminal, operated by a merchant, that is operable to initiate card-not-present transactions but is not operable to complete transactions and (2) comprising an instruction to route any authorization response corresponding to the request for approval to a second terminal operated by the merchant, wherein the second terminal is not able to initiate card-not-present transactions but is operable to complete transactions, wherein the merchant operates a plurality of other terminals at different locations, the plurality of other terminals each configured to transmit approval requests to the server, receive authorization messages from the server, and display the authorization messages to users, and wherein the first terminal is not operable to receive or display authorization messages;

computer-readable program code configured to receive an authorization response from the issuing institution, the authorization response indicative of whether the card-not-present payment transaction is approved, wherein the authorization response contains routing information indicative of a response path that includes the payment intermediary;

computer-readable program code configured to transmit the authorization response to the second terminal to complete the card-not-present payment transaction, wherein the transmitting comprises re-routing the authorization response from an original authorization response path ending at the first terminal to a modified authorization response path ending at the second terminal; and receiving a second request for approval of a card-present payment transaction from the second terminal, wherein the second terminal is configured to format for display at least a portion of the authorization response for display to the customer.

10. The computer program product of claim 9, wherein the transaction details are further indicative of the second terminal, and wherein the authorization response is transmitted to the second terminal based on the transaction details.

11. The computer program product of claim 9, wherein the card-not-present payment transaction is initiated by the customer as an electronic commerce transaction.

\* \* \* \* \*